United States Patent
Iwasaki et al.

(10) Patent No.: US 10,759,572 B2
(45) Date of Patent: Sep. 1, 2020

(54) POURER AND MANUFACTURING METHOD FOR SAME

(71) Applicant: TOYO SEIKAN GROUP HOLDINGS, LTD., Tokyo (JP)

(72) Inventors: Tsutomu Iwasaki, Kanagawa (JP); Masaki Aoya, Kanagawa (JP); Satoo Kimura, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/784,760

(22) Filed: Oct. 16, 2017

(65) Prior Publication Data
US 2018/0037376 A1 Feb. 8, 2018

Related U.S. Application Data

(63) Continuation of application No. PCT/JP2016/001984, filed on Apr. 12, 2016.

(30) Foreign Application Priority Data

Apr. 16, 2015 (JP) ................................ 2015-084272

(51) Int. Cl.
*B65D 47/06* (2006.01)
*B65D 47/40* (2006.01)
(Continued)

(52) U.S. Cl.
CPC ............. *B65D 47/06* (2013.01); *B29C 35/02* (2013.01); *B29C 57/04* (2013.01); *B65D 23/06* (2013.01);
(Continued)

(58) Field of Classification Search
CPC ......... B45D 47/06; B29C 35/02; B29C 57/04; B29C 43/361; B29C 2043/3205;
(Continued)

(56) References Cited

U.S. PATENT DOCUMENTS 2,854,163 A * 9/1958 Barnby .................. B65D 47/40
126/9 B
3,086,671 A * 4/1963 Zaleski .................. B65D 1/023
215/398
(Continued)

FOREIGN PATENT DOCUMENTS

JP S56106762 A 8/1981
JP 2002-302146 A 10/2002
(Continued)

OTHER PUBLICATIONS

Office Action issued in Japanese Patent Application No. 2015-084272; dated Feb. 20, 2018 (6 pages).
(Continued)

*Primary Examiner* — Lien M Ngo
(74) *Attorney, Agent, or Firm* — Osha Liang LLP (57) ABSTRACT

A pourer includes a pour spout, wherein the pour spout is configured to serve as a spout for a content liquid stored in a container main body, and is configured to be attached to a mouth part of the container main body, wherein the pour spout includes a surplus resin part provided on a part of a top surface of the pour spout through which the content liquid passes, and wherein the surplus resin part protrudes outwardly in the radial direction from an outer peripheral edge of the top surface of the pour spout.

3 Claims, 5 Drawing Sheets

(51) Int. Cl.
   *B65D 41/04* (2006.01)
   *B65D 41/16* (2006.01)
   *B65D 23/06* (2006.01)
   *B29C 57/04* (2006.01)
   *B29C 35/02* (2006.01)
   *B29C 43/36* (2006.01)
   *B29C 43/32* (2006.01)
   *B29L 31/56* (2006.01)

(52) U.S. Cl.
   CPC ............. *B65D 41/04* (2013.01); *B65D 41/16* (2013.01); *B65D 47/40* (2013.01); *B29C 43/361* (2013.01); *B29C 2043/3205* (2013.01); *B29L 2031/56* (2013.01)

(58) Field of Classification Search
   CPC ........ B65D 47/40; B65D 41/04; B65D 41/16; B65D 23/06; B29D 30/0601; B29L 2031/56
   USPC ......... 222/571, 566–570; 264/533, 536, 531, 264/299, 319, 328.1
   See application file for complete search history.

(56) References Cited

U.S. PATENT DOCUMENTS

| | | | | |
|---|---|---|---|---|
| 3,917,788 | A * | 11/1975 | Padovani | B26F 1/40 264/153 |
| 4,494,682 | A * | 1/1985 | Beckstrom | B65D 47/123 222/551 |
| 4,545,953 | A * | 10/1985 | Cage | B65D 23/06 264/533 |
| 4,591,078 | A * | 5/1986 | Weissman | B65D 47/40 222/517 |
| 4,664,295 | A * | 5/1987 | Iida | B29C 45/44 220/270 |
| 4,856,667 | A * | 8/1989 | Thompson | B65D 1/023 215/318 |
| 5,215,694 | A | 6/1993 | Bartimes et al. | |
| 5,330,083 | A * | 7/1994 | Bartimes | B29C 57/04 222/546 |
| 6,814,920 | B2 * | 11/2004 | Beck | B29C 57/12 156/226 |
| 7,435,073 | B2 * | 10/2008 | Chisholm | B29B 13/025 425/384 |
| 2006/0127618 | A1 * | 6/2006 | O'Connell | B29B 13/025 428/35.7 |

FOREIGN PATENT DOCUMENTS

| | | |
|---|---|---|
| JP | 2003-267364 A | 9/2003 |
| JP | 3145715 U | 10/2008 |
| JP | 4596142 B2 | 12/2010 |
| JP | 2011-079544 A | 4/2011 |
| JP | 2011-105382 A | 6/2011 |
| WO | 1992/16354 A1 | 10/1992 |

OTHER PUBLICATIONS

International Search Report issued in International Application No. PCT/JP2016/001984; dated Jul. 19, 2016 (2 pages).
International Preliminary Report on Patentability issued in International Application No. PCT/JP2016/001984; dated Oct. 26, 2017 (7 pages).
Office Action issued in Korean Application No. 10-2017-7029779; dated Jul. 5, 2018 (7 pages).
Extended European Search Report issued in European Application No. 16779763.8, dated Nov. 23, 2018 (6 pages).
Office Action issued in corresponding Chinese Application No. 201680022292.6; dated Sep. 20, 2019 (14 pages).

* cited by examiner

POURER AND MANUFACTURING METHOD FOR SAME

TECHNICAL FIELD

One or more embodiments of the present invention relate to a pourer that has excellent drip prevention property and a method for manufacturing the same.

BACKGROUND ART

Conventionally, various proposals have been made to prevent dripping of a content liquid remaining on the periphery of a spout after a required amount of the content liquid stored in a container has been poured from the spout.

For example, Patent Document 1 proposes a spout plug in which a protrusion is formed along the outer peripheral edge of an open end of a spout, and on the upper surface of this protrusion, a curved surface of which the diameter is increased as it is distant from the open end is formed, whereby liquid dripping is prevented by improving drip prevention property.

PATENT DOCUMENT

Patent Document 1: JP-A-2011-105382

However, the spout plug disclosed in Patent Document 1 has insufficient performance for liquids with high wettability such as edible oils and alcohols. Further, when an attempt is made to manufacture the spout plug disclosed in Patent Document 1 by injection molding, since the protrusion formed along the outer peripheral edge of the spout becomes an undercut shape, it must be taken out from a mold by "forcible release". Therefore, as described in paragraph [0038] of Patent Document 1, in order to suppress of deformation or the like caused by the "forcible release", it is necessary to devise, for example, the protrusion is intermittently arranged. As a result, the degree of freedom of design may be narrowed. Further, it is possible to deal with the undercut shape due to devising of the releasing structure of a mold, for example, by applying a slide core. However, in this case, the cost of manufacturing a mold may be increased.

SUMMARY

One or more embodiments of the present invention have been made taking the above-mentioned circumstances into consideration. One or more embodiments of the present invention provide a pourer that has excellent drip prevention property and can be applied to a pourer molded into a prescribed shape by injection molding, as well as to provide a method for manufacturing the same.

The pourer according to one or more embodiments of the present invention has a configuration in which a pourer provided with a pour spout that serves as a spout for a content liquid stored in a container main body, and is used by attaching to a mouth part of the container main body, wherein the pourer has a surplus resin part that protrudes outwardly in the radial direction from an outer peripheral edge of a top surface of the pour spout in at least a part of said top surface of the pour spout through which the content liquid passes.

The method for manufacturing a pourer according to one or more embodiments of the present invention is a method for manufacturing a pour spout that serves as a spout for a content liquid stored in a container main body, and is used by attaching to a mouth part of the container main body, comprising:

molding the pourer in a prescribed shape by using a thermoplastic resin, and forming a surplus resin part that protrudes outwardly in the radial direction from an outer peripheral edge of a top surface of the pour spout in at least a part of said top surface of the pour spout through which the content liquid passes by heating press in which a heating plate is pressed against said top surface of the pour spout.

According to the pourer of one or more embodiments of the present invention, by allowing a residual liquid of a poured content liquid to stay easily in a surplus resin part that protrudes outwardly in the radial direction from an outer peripheral edge of a top surface of a spout to improve drip prevention property, whereby liquid dripping after a required amount of the content liquid has been poured can be suppressed.

Further, according to the method for manufacturing the pourer of one or more embodiments of the present invention, since the surplus resin part is formed by heating press, it is not necessary to modify existing molds, and also is not necessary to take into consideration disadvantages such as deformation when releasing the pourer from of the mold, and as a result, it is possible to suppress the cost incurred for a mold low.

DETAILED DESCRIPTION

Hereinafter, one or more embodiments of the present invention will be explained with reference to the drawings.

Figure 1:
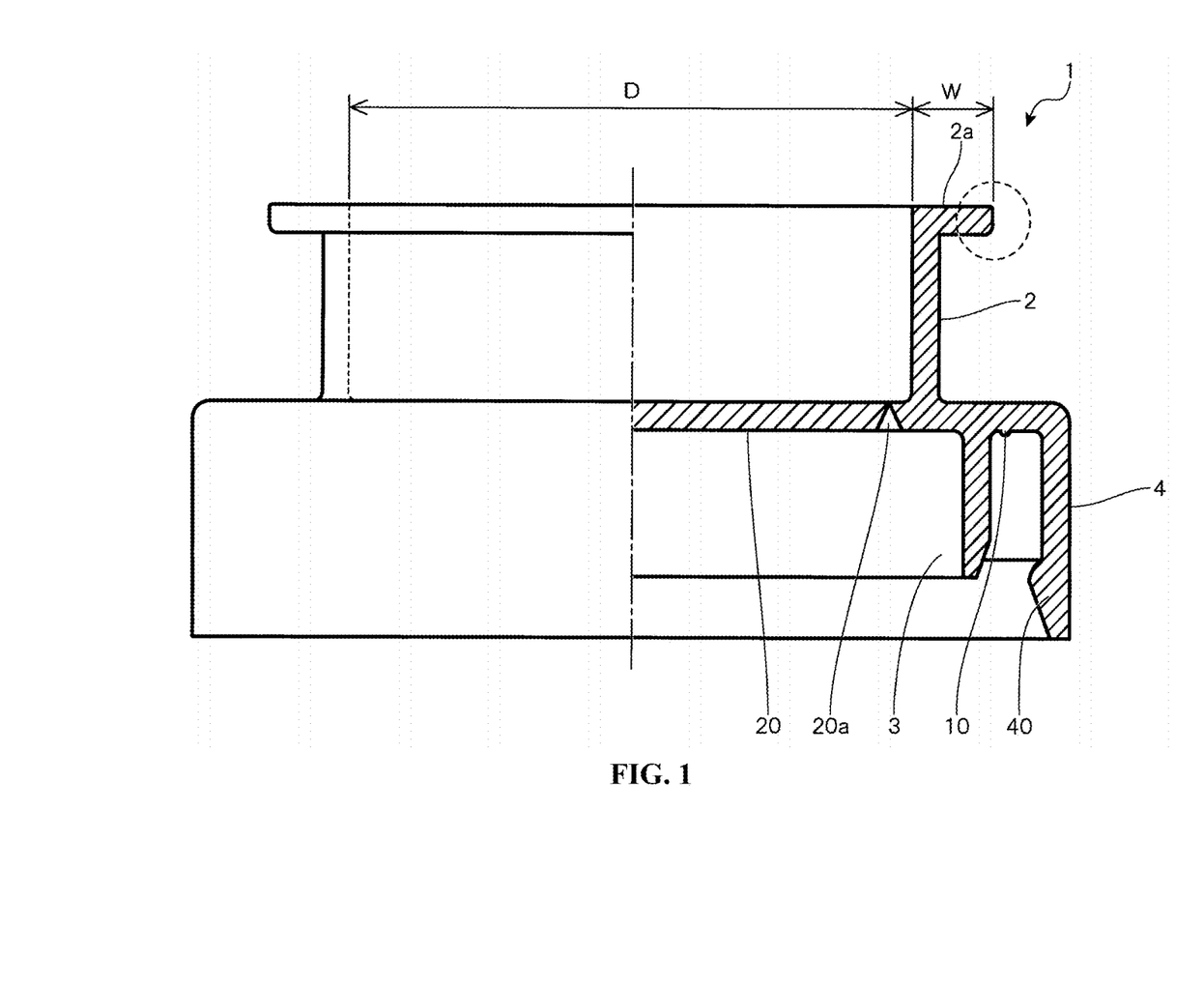
FIG. 1 is a half sectional view of the pourer according to one or more embodiments of the present invention.

A pourer 1 shown in FIG. 1 is provided with a pour spout 2 that serves as a spout for a content liquid stored in a container main body (not shown), an inner tubular part 3 and an outer tubular part 4 concentrically hanging down, and is used by attaching to a mouth part of the container main body.

FIG. 1 is a half sectional view obtained by combining the front view and the longitudinal cross sectional view of the pourer according to this embodiment.

When the pourer 1 is attached to the mouth part of the container main body, the inner tubular part 3 is brought into close contact with the inner circumferential surface of the mouth part of the container main body, and an annular fitting part 40 formed along the circumferential direction on the inner peripheral surface on the lower end side of the outer tubular part 4 is fitted to a fitting part formed on the outer peripheral surface side of the mouth part of the container main body, whereby it can be attached in a liquid-tight manner to the mouth part of the container main body by plugging. Further, in order to attach the pourer 1 to the mouth part of the container main body more liquid-tightly, the pourer 1 is provided with an annular protrusion 10 that contacts the top surface of the mouth part of the container main body.

The pour spout 2 rises in a tubular manner and a sealing partition wall 20 is provided on the inner circumferential side of the base part thereof, and it can be opened by tearing the sealing partition wall 20 from a notch (score) 20a formed annually along the circumferential direction. After the opening, by inclining the container main body, the content liquid stored in the container main body is poured outside the container through the pour spout 2.

Figure 4A:
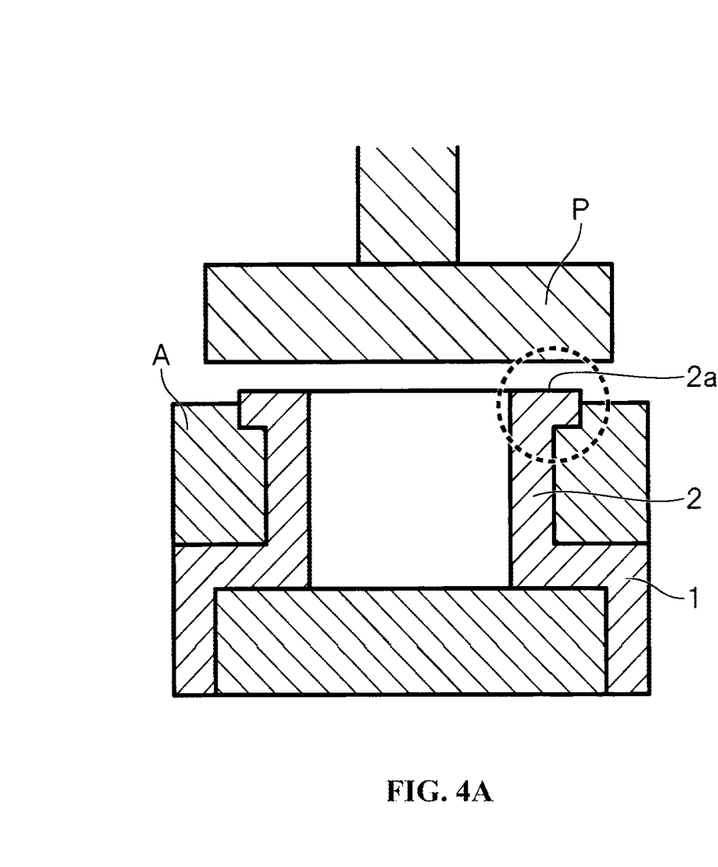
FIG. 4A is an explanatory view showing one example of forming the surplus resin part by heating press.

Such pourer 1 can be molded into a predetermined shape by molding methods such as injection molding by using a thermoplastic resin, for example, a polyolefin-based resin such as polypropylene and polyethylene, and a polyester-based resin such as polyethylene terephthalate. In this embodiment, after molding the pourer 1 into a predetermined shape by using a thermoplastic resin, as shown in FIG. 4A, by conducting heating press in which a heating plate P is pressed against a top surface 2a of the pour spout 2, a surplus resin part 5 that protrudes outwardly in the radial direction from the outer peripheral edge of the top surface 2a is formed in at least a part of the top surface 2a of the pour spout 2 through which the content liquid passes. As a result, the pourer 1 according to this embodiment is completed.

Figure 4B:
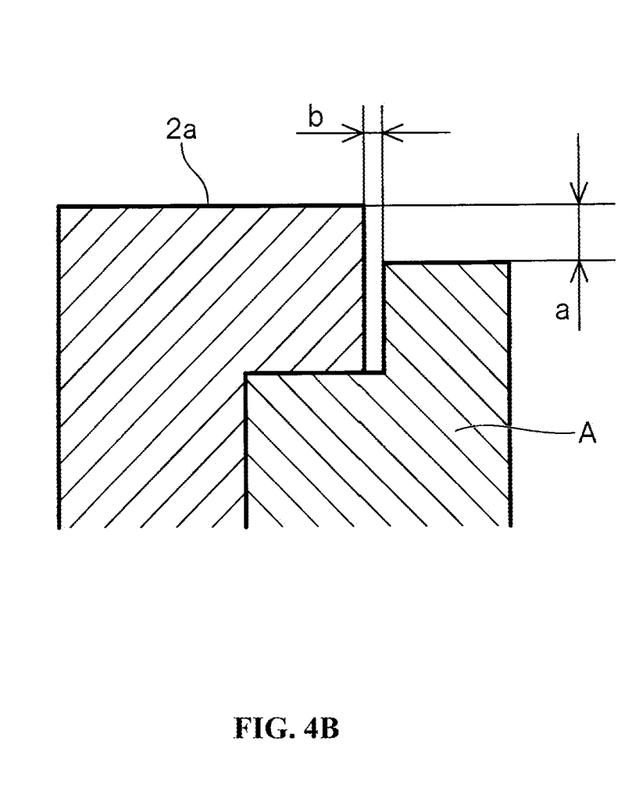
FIG. 4B is an explanatory view showing one example of forming the surplus resin part by heating press.

The surplus resin part 5 is formed in a way that the resin of a surface layer is molten by the heating plate P that is pressed against the top surface 2a of the pour spout 2, and part of the molten resin is pushed out outwardly in the radial direction from the outer peripheral edge of the top surface 2a, and is then solidified in that state. The shape of the surplus resin part 5 formed in this way is appropriately adjusted by the temperature of the heating plate P when pressing it against the top surface 2a of the pour spout 2, the pressing pressure for pressing the heating plate P, the time during which the heating plate P is pressed, etc. Further, as shown in FIG. 4B, the shape of the surplus resin part 5 can be appropriately adjusted by clearance "a" between the top surface 2a of the pour spout 2 and anvil A, clearance "b" between the outer peripheral edge of the top surface 2a and the anvil A, etc.

Figure 2A:
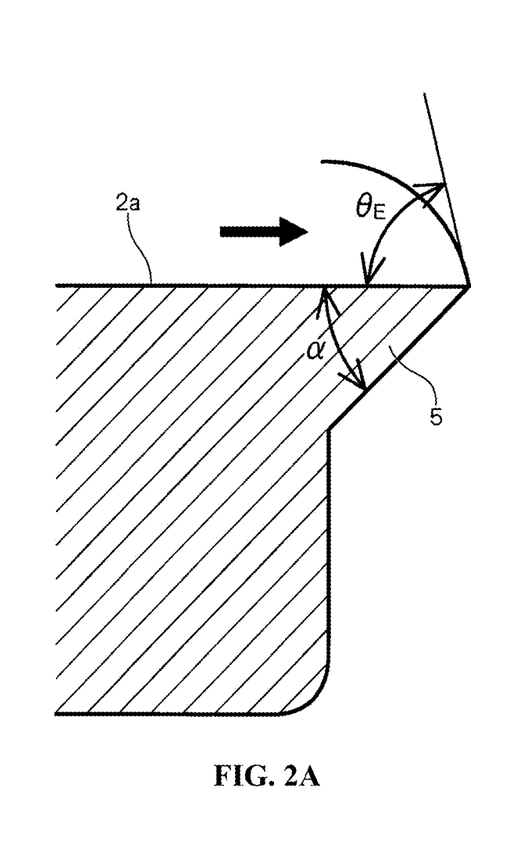
FIG. 2A is a cross sectional view of essential parts showing one example of the surplus resin part.
Figure 2B:
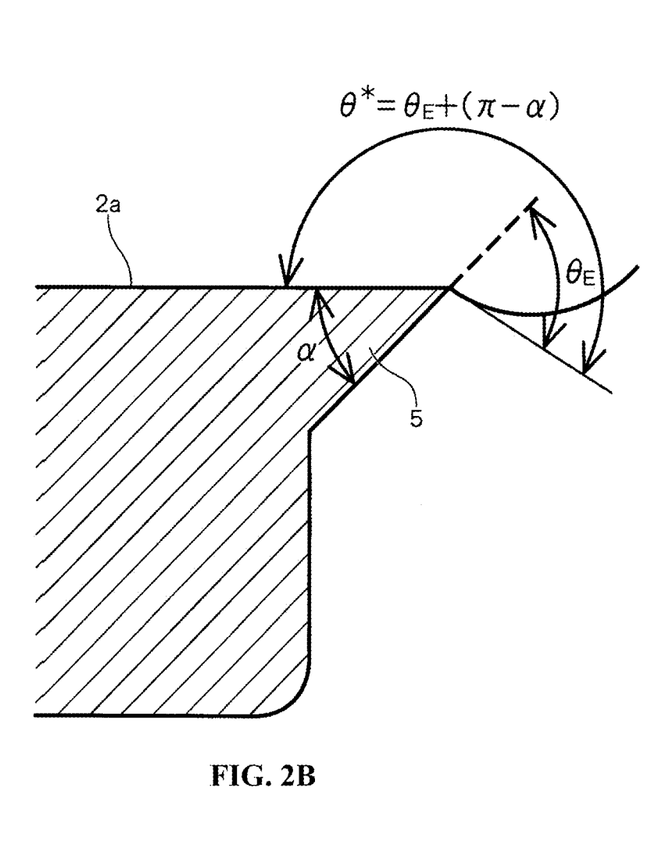
FIG. 2B is a cross sectional view of essential parts showing one example of the surplus resin part.
Figure 3:
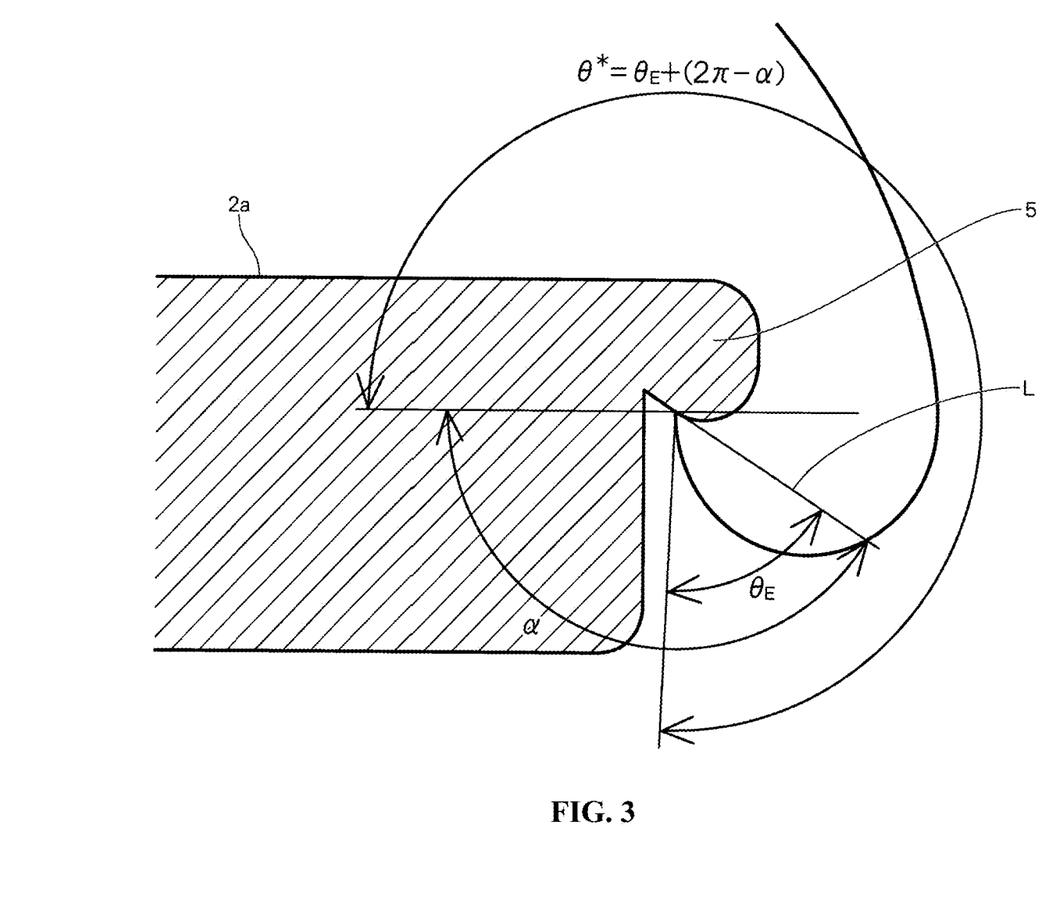
FIG. 3 is a cross sectional view of essential parts showing another example of the surplus resin part.

As for the shape of the surplus resin part 5, for example, as shown in FIGS. 2A and 2B, it can be a shape in which the tip thereof protrudes at an acute angle, or as shown in FIG. 3, it can be a shape in which the tip thereof protrudes in a liquid droplet manner.

In FIGS. 2A, 2B, and 3, a part surrounded by a chain line in FIG. 1 is shown in an enlarged manner. FIG. 4B is an enlarged view of a part surrounded by a chain line in FIG. 4A.

According to this embodiment, by forming such surplus resin part 5, drip prevention property when pouring a content liquid from the pour spout 2 is improved, whereby liquid dripping after a required amount of the content liquid is poured from the pour spout 2 can be suppressed. This suppression is thought to be realized by the following mechanism.

That is, as shown in FIGS. 2A and 2B, when the liquid advancing at a contact angle $\theta_E$ reaches an edge part (see FIG. 2A), when an angle formed by the advancing surface of the liquid and the outer surface of the edge part is taken as a, the liquid stays in the edge part until the advancing angle (the critical contact angle of the edge part) $\theta^*$ becomes $\theta^* = \theta_E + (\pi - \alpha)$ (see FIG. 2B). This is a phenomenon known as the pinning effect in relationship between the surface tension and the contact angle of a liquid. That is, when the surplus resin part 5 is formed so that the tip thereof protrudes at an acute angle ($\alpha < 90°$), the advancing angle increases due to the pinning effect, and the content liquid tends to stay easily in the surplus resin part 5 due to the surface tension. As a result, the drip prevention property when the content liquid is poured from the pour spout 2 is improved, and liquid dripping after a required amount of the content liquid is poured from the pour spout 2 can be suppressed.

In the example shown in FIGS. 2A and 2B, the upper surface of the surplus resin part 5 is flush with the top surface 2a of the spout part 2, but the configuration is not limited thereto. If the surplus resin part 5 is formed in a shape in which the tip thereof protrudes at an acute angle, although not particularly shown, the surplus resin part 5 may be formed such that the upper surface of the surplus resin part 5 is inclined (slant) linearly or curvedly relative to the top surface 2a of the pour spout 2.

Further, as shown in FIG. 3, when the tip of the surplus resin part 5 protrudes in a liquid droplet manner, so that the advancing surface of the content liquid curves downwardly in an arcuate manner (overhang), the content liquid that has flown to the root side beyond the lowest point of the surplus resin part 5 stays on the surplus resin part 5 at a critical contact angle $\theta_E$ due to the surface tension. It is assumed that, if an angle formed by the tangent line L with the surplus resin part 5 at its end point and the top surface 2a of the pour spout 2 is taken as a, the advancing angle (critical contact angle of the edge part) $\theta^*$ becomes $\theta^* = \theta_E + (2\pi - \alpha)$, and the content liquid does not drip since it is supported by an apparently large surface tension at the edge part. By this configuration, the drip prevention property when pouring the content liquid from the pour spout 2 can be improved, and liquid dripping after a required amount of the content liquid is poured from the pour spout 2 can be suppressed.

As mentioned above, in this embodiment, regarding the pourer 1 molded into a prescribed shape by injection molding, etc., by forming the surplus resin part 5 therein by heating press, the surface tension of a liquid explained by the pinning effect is apparently increased. As a result, by allowing the residual liquid of the poured content liquid to stay easily in the surplus resin part 5 to improve the drip prevention property, whereby liquid dripping after a required amount of the content liquid is poured from the pour spout 2 can be suppressed.

Further, since the surplus resin part 5 is formed by heating press, when the pourer 1 is manufactured, it is not necessary to modify existing molds, and also is not necessary to take into consideration disadvantages such as deformation when releasing the pourer from the mold, and as a result, it is possible to suppress the cost incurred for a mold low.

EXAMPLES

One or more embodiments of the present invention will be explained in more detail with reference to specific Examples.

Example 1

Figure 5A:
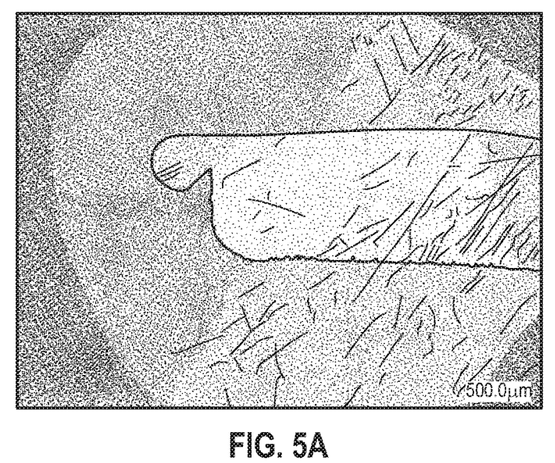
FIG. 5A shows a photograph of a cross section of an edge in accordance with Example 1.

By using low-density polyethylene (LJ8041 manufactured by Japan Polyethylene Corporation), the pourer 1 shown in FIG. 1 was molded by injection molding such that the inner diameter D of the pour spout 2 was 22 mm and the width W of the top surface 2a of the pour spout 2 was 3 mm. Under the conditions where the clearance "a" between the top surface 2a of the pour spout 2 and the anvil A was 1 mm and the clearance "b" between the outer peripheral edge of the top surface 2a and the anvil A was 0.5 mm, the heating plate P that was heated to 280° C. was pressed against the top surface 2a of the molded pour spout 2 at a pressing pressure of 200 N for a pressing time of 5 seconds. As a result, the surplus resin part 5 that extends in a liquid droplet manner along the outer peripheral edge of the top surface 2a of the pour spout 2 was formed. A photograph of a cross section of the surplus resin part 5 formed in the edge part of the top surface 2a in this example is shown in this example in FIG. 5A.

5 μL of pure water was dropped on the top surface 2a of the pour spout 2, and the advancing angle (critical contact angle at the edge part) θ* was measured and found to be θ*=237°.

The obtained pourer 1 was attached to the mouth part of the container main body in which edible oil was stored and the container was held on a robot hand. An operation wherein a prescribed amount of the content liquid was poured was conducted repeatedly at an interval of 2 seconds. No liquid dripping occurred even if such operation was repeated 100 times.

Example 2

Figure 5B:
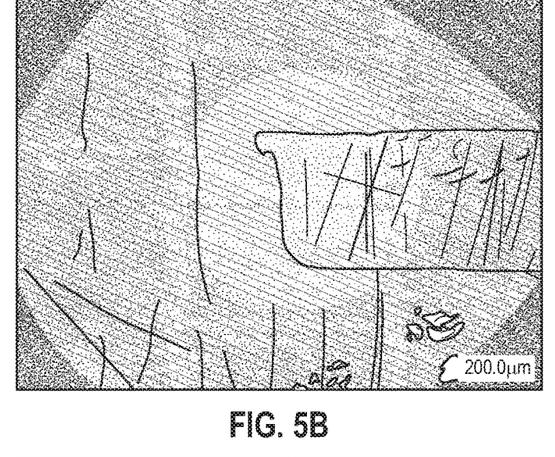
FIG. 5B shows a photograph of a cross section of an edge part in accordance with Example 2.

The surplus resin part 5 was formed under the same conditions as those in Example 1, except that the temperature of the heating plate P was changed to 160° C. A photograph of the surplus resin part 5 formed in an edge part of the top surface 2a in this example is shown in FIG. 5B.

5 μL of pure water was dropped on the top surface 2a of the pour spout 2, and the advancing angle (critical contact angle at the edge part) θ* was measured and found to be θ*=249°.

The obtained pourer 1 was attached to the mouth part of the container main body in which edible oil was stored and the container was held on a robot hand. An operation wherein a prescribed amount of the content liquid was poured was conducted repeatedly at an interval of 2 seconds. No liquid dripping occurred even if such operation was repeated 100 times.

Comparative Example 1

Figure 5C:
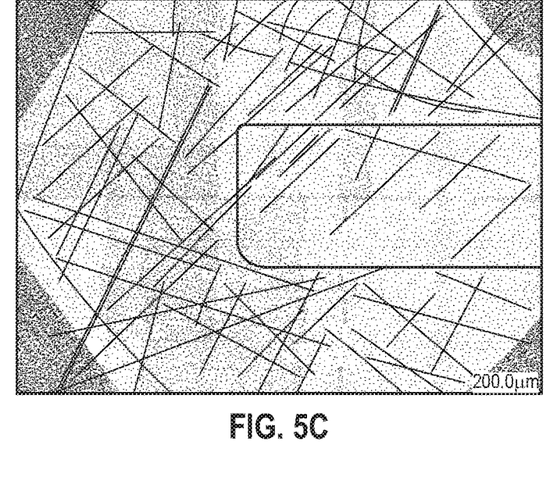
FIG. 5C shows a photograph of a cross section of an edge part in accordance with Comparative Example 1.

A pourer was molded by injection molding in the same manner as in Example 1. Heating press was not conducted and hence no surplus resin part was formed. A photograph of the cross section of an edge part of the top surface in this example is shown in FIG. 5C.

5 μL of pure water was dropped on the top surface of the pour spout, and the advancing angle (critical contact angle at the edge part) θ* was measured and found to be θ*=199°.

The obtained pourer was attached to the mouth part of the container main body in which edible oil was stored and the container was held on a robot hand. An operation wherein a prescribed amount of the content liquid was poured was conducted repeatedly at an interval of 2 seconds. Liquid dripping occurred at the time of the first operation.

Hereinabove, one or more embodiments of the present invention were explained. The present invention is not limited to the above-mentioned embodiments, and it is needless to say that various modifications are possible within the scope of the present invention.

For example, in the above-mentioned embodiments, an explanation was made taking as an example in which the pourer 1 was attached to the mouth part of the container main body by plugging. Attachment may be conducted by means of a screw. As long as the surplus resin part 5 that protrudes outwardly in the radial direction from the outer peripheral edge of the top surface 2a is formed in at least a part of the top surface 2a of the pour spout 2 through which the content liquid passes, as for other specific configurations, various configurations known in this type of pourer can be applied.

Further, the top surface 2a of the pour spout 2 may be an uneven surface. It is also possible to allow the surface to be uneven by applying fine particles (metal oxide fine particles or polymer fine particles), a porous body, a crystalline additive or the like to the surface. Further, an uneven surface can be formed by mixing such agents with a resin that forms the pourer 1, or pressing a stamper in which a transfer pattern is formed, or conducting compression molding or injection molding by using a mold. In addition, a surface processing such as blast processing, plasma processing, corona processing, etc. or coating of a liquid repellent agent, a liquid lubricant, etc. may conducted. These processings can be combined with formation of the uneven surface.

The documents described in the specification and the specification of Japanese application(s) on the basis of which the present application claims Paris convention priority are incorporated herein by reference in its entirety.

INDUSTRIAL APPLICABILITY

One or more embodiments of the present invention can be used as a pourer that is attached to a container main body that accommodates water, soy sauce, sauce, edible oil, liquid detergent, etc. as a content liquid, and improves drip prevention property when pouring the content liquid, whereby liquid dripping after a required amount of the liquid content is poured is suppressed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF NUMERICAL SYMBOLS

1. Pourer
2. Pour spout
2a. Top surface
5. Surplus resin part

The invention claimed is:

1. A method for manufacturing a pourer comprising a pour spout, comprising:

molding the pourer comprising the pour spout using a thermoplastic resin, wherein the pour spout is configured to serve as a spout for a content liquid stored in a container main body, and wherein the pourer is configured to be attached to a mouth part of the container main body;

melting a resin of a surface layer on a top surface of the pour spout and pushing out a molten resin on the top surface of the pour spout outwardly, in the radial direction, from an outer peripheral edge of the top surface of the pour spout by hot-pressing the top surface of the pour spout with a heating plate;

forming a surplus resin part protruded outwardly, in the radial direction, from the outer peripheral edge of the top surface of the pour spout by solidifying the pushed out molten resin;

forming an uneven pattern on the top surface of the pour spout by transferring the uneven pattern formed on a surface of the heating plate to the top surface of the pour spout, during pushing out the molten resin; and conducting a surface processing of blast processing, plasma processing, or corona processing, or coating of a liquid repellent agent or a liquid lubricant on the uneven pattern formed on the top surface of the pour spout.

2. The method according to claim 1, wherein the surplus resin part is formed into a shape in which a tip thereof protrudes in a liquid droplet manner.

3. The method according to claim 2, wherein the surplus resin part is formed into a shape in which a tip thereof protrudes at an acute angle.

* * * * *

UNITED STATES PATENT AND TRADEMARK OFFICE
CERTIFICATE OF CORRECTION

PATENT NO. : 10,759,572 B2
APPLICATION NO. : 15/784760
DATED : September 1, 2020
INVENTOR(S) : Tsutomu Iwasaki et al.

It is certified that error appears in the above-identified patent and that said Letters Patent is hereby corrected as shown below:

In the Claims

\*\* Claim 3, Column 7, Line 17, the phrase "according to claim 2" should read
-- according to claim 1 -- \*\*

Page 1 of 1

Signed and Sealed this
Eighth Day of December, 2020

Andrei Iancu
*Director of the United States Patent and Trademark Office*